United States Patent
Yoshida

(10) Patent No.: US 7,161,783 B2
(45) Date of Patent: Jan. 9, 2007

(54) OVERCURRENT PROTECTION CIRCUIT FOR SWITCHING POWER SUPPLY

(75) Inventor: Katsuyuki Yoshida, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 231 days.

(21) Appl. No.: 10/819,983

(22) Filed: Apr. 8, 2004

(65) Prior Publication Data

US 2004/0201937 A1    Oct. 14, 2004

(30) Foreign Application Priority Data

Apr. 8, 2003    (JP)    ............... 2003-104228

(51) Int. Cl.
*H02H 3/08*    (2006.01)

(52) U.S. Cl. ............... 361/93.7; 361/93.1; 361/93.5; 361/100

(58) Field of Classification Search .............. 361/93.1, 361/93.5, 93.7
See application file for complete search history.

(56) References Cited

U.S. PATENT DOCUMENTS 5,297,014 A * 3/1994 Saito et al. .............. 363/21.17

FOREIGN PATENT DOCUMENTS

| JP | 63-217973 A | 9/1988 |
|---|---|---|
| JP | 5-50995 U | 7/1993 |
| JP | 05-211715 | 8/1993 |
| JP | 2000-156972 | 6/2000 |
| JP | 2000-322133 | 11/2000 |
| JP | 2001-268909 A | 9/2001 |

* cited by examiner

*Primary Examiner*—Stephen W. Jackson
*Assistant Examiner*—Terrence Willoughby
(74) *Attorney, Agent, or Firm*—Crowell & Moring LLP

(57) ABSTRACT

In an overcurrent protection circuit for a switching power supply having multiple voltage supply sections, an overcurrent in a low voltage supply section is detected to make it possible to take a countermeasure against overload in a transformer winding, using a simple and low cost circuit design. The circuit comprises: a current detection resistor 33 to detect a current in secondary side of the transformer; transistors 53 and 52 to be turned on by the current detection; a photocoupler 50 to be turned on and off by the transistors; and a switching power supply controller 7 to control on-duty of a power MOSFET 6 for removing the overcurrent. The current detection resistor 33 is provided in the line of a secondary winding 30 so as to be able to individually limit a current flowing through the secondary winding 30.

7 Claims, 2 Drawing Sheets

OVERCURRENT PROTECTION CIRCUIT FOR SWITCHING POWER SUPPLY

BACKGROUND OF THE INVENTION

1. Field of the Invention

The present invention relates to an overcurrent protection circuit for a switching power supply which is to be installed in e.g. a laser printer, and has multiple voltage supply sections.

2. Description of the Related Art

Some of known overcurrent protection circuits for switching power supplies are of multiple output type to operate in forward mode. (Refer to, e.g., Japanese Laid-open Patent Publication 2000-322133, paragraphs 0007 to 0013 and 0022, FIG. 1.) This Patent Publication discloses a switching power supply circuit of multiple output type, in which a transformer to perform the switching operation comprises, for output at secondary side thereof, a lower voltage supply section of 3.3 V and a higher voltage supply section of 5 V. In this switching power supply circuit, an electric current value flowing through a resistor provided in an output line at secondary side of each voltage supply section is detected by a comparator for overcurrent detection (for overcurrent protection). When it is detected by the comparator that the electric current reaches an overcurrent detection value, a photocoupler is turned on by the detected output, thereby controlling on-duty of a power switching element at primary side of the transformer so as to shut down the entire circuit.

A switching power supply circuit having such multiple output voltage supply sections has the following undesirable possibility. For example, when the output voltage of the 3.3 V voltage supply section is maintained within a rated range while the output voltage of the 5 V voltage supply section decreases, then the 5 V voltage supply section gets into an overload mode, and continues to further decrease gradually. When the output voltage of the 5 V voltage supply section decreases below approximately 3.3 V, resulting in reversal in magnitude between the two output voltages, there is a possibility that electronic components, such as ICs, providing the two voltage supply sections may be destroyed due, e.g., to latch-up phenomena. For solving such problem, according to the above-referred Japanese Laid-open Patent Publication 2000-322133, the entire power supply is shut down when the voltage of the higher voltage supply section decreases to approximately the voltage of the lower voltage supply section.

On the other hand, in a switching power supply circuit having a single, rather than multiple, output voltage supply section, it is known to provide an overcurrent protection circuit for protecting the switching power supply from an overcurrent exceeding the control limit of a primary side control circuit. (Refer to, e.g., Japanese Laid-open Patent Publication Hei 5-211715, paragraph 0012, FIG. 1). According to this overcurrent protection circuit, a decrease of the output voltage is detected, the decrease being caused when the secondary side of a transformer is brought to short-circuit state or nearly short-circuit state. Such detected signal is input, via a photocoupler, to the primary side control circuit which performs pulse-width modulation for controlling a switching element, thereby attempting to maintain the output voltage of the switching power supply at a constant value. At this time, the on-time of the switching element increases to cause an overcurrent to flow. The voltage generated by the overcurrent flow between both ends of an overcurrent detection resistor provided in the primary side of the transformer is divided and applied to the primary side control circuit in order to perform overcurrent protection by narrowing the pulse width.

Furthermore, in a switching power supply in which an overvoltage protection signal and a feedback signal from an output voltage of secondary side of a transformer are superimposed on each other and transmitted to primary side of the transformer using one photocoupler, it is known to provide an arrangement for making it possible to stop the operation of the power supply when an abnormal condition such as photocoupler failure occurs. (Refer to, e.g., Japanese Laid-open Patent Publication 2000-156972, paragraph 0021, FIG. 1.). In this power supply, the primary side of the transformer is provided with detection means for detecting the feedback signal transmitted via the photocoupler, with the feedback signal being divided into plural levels for detection.

Among the conventional technologies as described above, the switching power supply circuit having plural output voltage supply sections according to the above-referred Japanese Laid-open Patent Publication 2000-322133 has drawbacks as follows. Although the entire power supply can be shut down when the voltage of the higher voltage supply section decreases to approximately the voltage of the lower voltage supply section, a total overcurrent in the primary side of the transformer is not detected for shutting down the entire power supply. Accordingly, it is needed to provide an overcurrent detection circuit in each voltage supply section of the secondary side of the transformer. In addition, a comparator is used for the circuit, thereby causing the cost of the circuit to increase. It is to be noted that the Japanese Laid-open Patent Publication 2000-322133 does not disclose any concept that detection of an overcurrent in a low voltage supply section in a circuit having multiple output voltage supply sections may enable a countermeasure against overload in windings of a transformer for preventing e.g. insulation breakdown.

On the other hand, the overcurrent protection circuit disclosed in the Japanese Laid-open Patent Publication Hei 5-211715 does not have multiple output voltage supply sections, and does not detect an overcurrent at the secondary side of the transformer for protection operation, although the output voltage of the secondary side of the transformer is detected therein.

Likewise, the switching power supply disclosed in the Japanese Laid-open Patent Publication 2000-156972 does not detect an overcurrent at the secondary side of the transformer for protection operation, either.

SUMMARY OF THE INVENTION

An object of the present invention is to provide such an overcurrent protection circuit for a switching power supply having multiple output voltage supply sections that it is possible to take a countermeasure against overload in transformer windings for enhancing safety of the power supply, using a simple and low cost circuit design by detecting at least an overcurrent in a low voltage supply section.

It is, therefore, an object of the present invention to provide an overcurrent protection circuit for a switching power supply, comprising:

a transformer having a primary side comprising a primary winding and a secondary side comprising multiple secondary windings, the primary winding being provided with a DC current;

a power switching element to switch on and off the DC current in the primary winding for inducing multiple currents in the multiple secondary windings, respectively, the currents being rectified and smoothed to provide multiple DC voltages, respectively, at the secondary side, thereby forming multiple voltage supply sections to output the multiple DC voltages, respectively, at the secondary side;

a current detection resistor for detecting a current flowing in the secondary side;

a switching element to be turned on when a voltage between both ends of the current detection resistor exceeds a given voltage value;

a photocoupler to be turned on and off depending on state of the switching element; and a switching control circuit to control on-duty of the power switching element in response to turning on and off of the photocoupler, wherein the current detection resistor is provided at least in a line of one of the multiple secondary windings which, among the multiple voltage supply sections, belongs to a lower output voltage supply section.

According to one aspect of the present invention, when the output current of the secondary side of the transformer becomes an overcurrent, it is detected by the current detection resistor provided in the secondary side of the transformer, so that the switching element is turned on, whereby the photocoupler is turned on. Based on the feedback signal from the photocoupler, the switching control circuit performs control to decrease the on-duty of the power switching element in the primary side of the transformer, thereby removing the overcurrent. A feature of such design is in that the current detection resistor in the secondary side of the transformer detects a current flowing through a secondary winding of the transformer which outputs a lower voltage, so that the current detection resistor can individually limit the current flowing through the secondary winding.

Generally, a secondary winding of a transformer for outputting a lower voltage has a wire diameter smaller than that for outputting a high voltage, causing a problem that insulation breakdown of the former is more likely to occur than that of the latter. However, owing to the above-described feature, such problem can be solved, thereby enhancing safety of the power supply.

Another feature is that no comparator is needed for an overcurrent detection circuit in the secondary side of the transformer, resulting in simple design and low circuit cost.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

An overcurrent protection circuit for a switching power supply according to an embodiment of the present invention will be described hereinafter with reference to the drawings.

Figure 1:
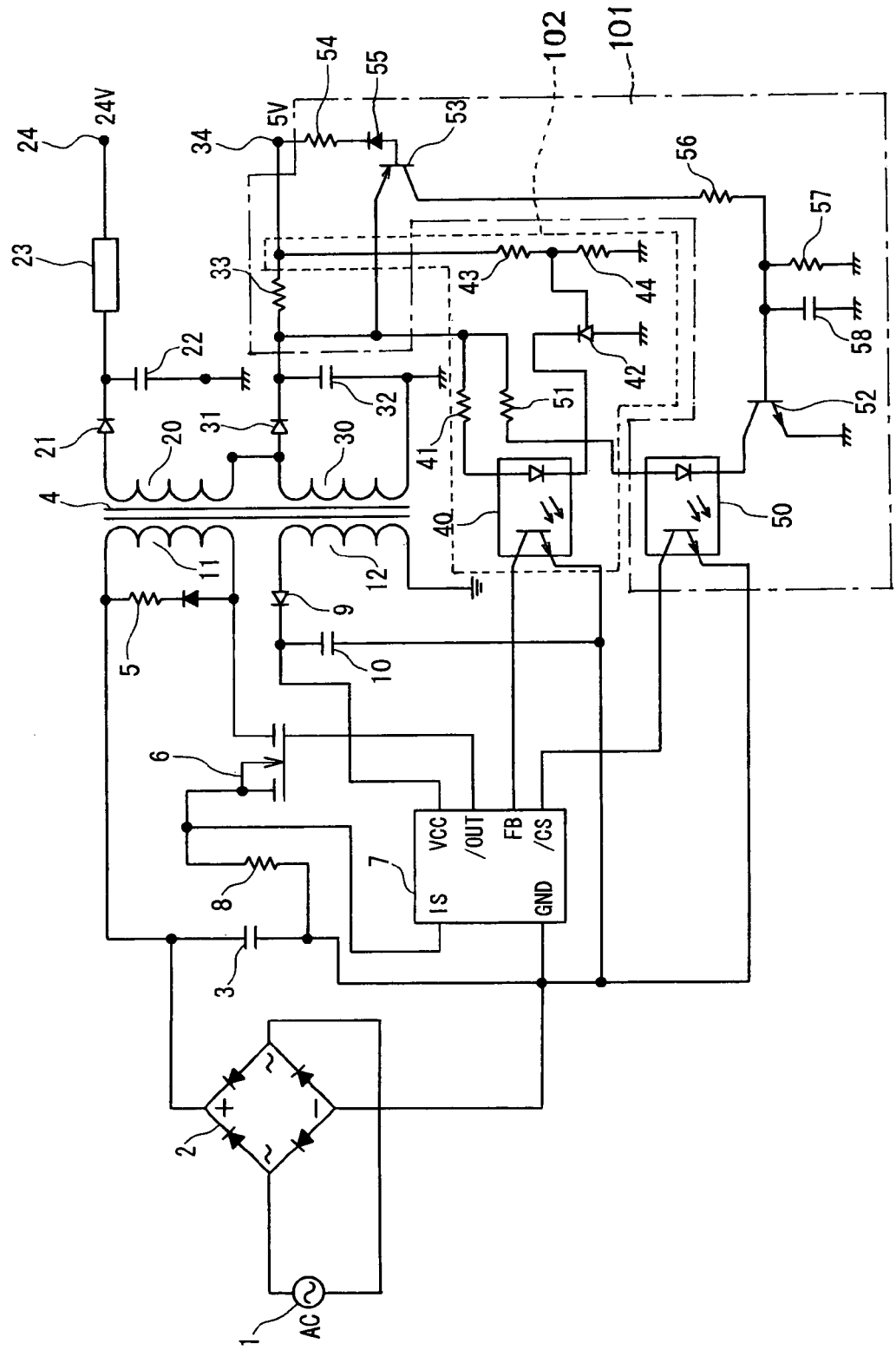
FIG. 1 is a schematic circuit diagram of an overcurrent protection circuit for a switching power supply according to an embodiment of the present invention.

FIG. 1 shows a circuit diagram of an overcurrent protection circuit for a switching power supply circuit to be installed in electronic equipment such as a laser printer. This switching power supply circuit is of a type having multiple output voltage supply sections that are herein assumed to output 24 V and 5 V. An AC power from a commercial AC power source 1 is converted to a DC power by a diode bridge 2 and a capacitor 3. This DC power is intermittently energy-transferred, by a power MOSFET 6 (power switching element) and a transformer 4, to a secondary side of the transformer 4 (hereafter simply referred to as secondary side).

A switching power supply controller (switching control circuit) 7 controls on-duty of the power MOSFET 6 on the basis of a voltage detected by a resistor (current detection resistor) 8 for detecting a current flowing in a primary side of the transformer (hereafter simply referred to primary side) and on the basis of feedback signals from later described photocouplers 40 and 50. A snubber circuit 5 resets the transformer 4. In this switching power supply circuit, output voltages (24V and 5 V voltage supply sections) to output terminals 24 and 34 of the switching power supply are controlled to be constant. In the present embodiment, the switching power supply controller 7 oscillates with a constant frequency, and performs on-duty-based control.

When the switching power supply controller 7 starts its oscillation, a current induced in an auxiliary winding of the transformer 4 is supplied to both ends of a capacitor 10 via a diode 9, whereby the voltage between both ends of the capacitor 10 serves as a power supply. It is to be noted here that details of a start-up power supply for the switching power supply controller 7 are omitted in the drawing.

At the secondary side of the 24 V output voltage supply section of the transformer 4, intermittent energy generated in a secondary winding 20 is rectified and smoothed by a diode 21 and a capacitor 22, and is output, as a DC power, to the output terminal 24 via a choke 23. Similarly, at the secondary side of the 5 V output voltage supply section of the transformer 4, intermittent energy generated in a secondary winding 30 is rectified and smoothed by a diode 31 and a capacitor 32, and is output, as a DC power, to the output terminal 34.

The overcurrent protection circuit according to the present embodiment comprises an overcurrent detection circuit 101 (surrounded by dot-dashed line) to detect an overcurrent at the secondary side for individually limiting the current flowing in the secondary side within a maximum allowable current value. The overcurrent protection circuit can further comprise a voltage detection circuit 102 (surrounded by dashed line) to detect a voltage at the secondary side for detecting a decrease of the secondary side voltage below a given voltage value, e.g., when the secondary side is brought to short-circuit state or nearly short-circuit state. The overcurrent protection circuit further comprises the switching power supply controller 7 to operate in response to the outputs of the photocouplers 50 and 40 of the overcurrent detection circuit 101 and the voltage detection circuit 102, respectively, and also comprises the power MOSFET 6 to operate in response to the output of the switching power supply controller 7.

Firstly, the overcurrent detection circuit 101 for detecting an overcurrent in the secondary side will be described. A current detection resistor 33 in the secondary side is provided only in the line of the secondary winding 30 which, among the multiple voltage supply sections, belongs to the lower voltage supply section to output 5 V. A transistor (first switching element) 53 is turned on when the voltage between both ends of the current detection resistor 33 in the secondary side exceeds a given value. The transistor 53 has: an emitter connected to an end, at the winding side, of the current detection resistor 33; a base connected, via a resistor 54 and a temperature compensation diode 55, to the other end of the current detection resistor 33, that is the output terminal 34; and a collector connected to a later described transistor 52 via a resistor 56. The resistance of the current detection resistor 33 can be so selected that, e.g., in the case where detection level at the secondary side is assumed to be 10 A, the resistance of 0.1 Ω is used to turn on the transistor 53 when a voltage difference of 1 V is generated between both ends of the current detection resistor 33.

The transistor (second switching element) 52 is turned on when the transistor 53 is turned on. The transistor 52 has a collector connected to a cathode of a light emitting element of the photocoupler 50, and an emitter connected to GND (ground). Between a base of the transistor 52 and GND, a discharge resistor 57 and a capacitor 58 for preventing malfunction at the time of start-up of the power supply are connected in parallel. Depending on the state of the transistor 52, the photocoupler (first photocoupler) 50 is turned on and off, wherein an emitter of its light emitting element is connected, via a resistor 51, to the end of the current detection resistor 33 at the winding side.

Next, the voltage detection circuit 102 for detecting voltage at the secondary side will be described. This voltage detection circuit is provided in the low voltage supply section to output 5 V, and functions to detect a decrease of the secondary side voltage below a given voltage value. Voltage detection resistors 43 and 44 are connected in series between the output terminal 34 and GND. A switching element (third switching element) 42 operates in response to the voltage detected at a voltage division point between the voltage detection resistors 43 and 44, and is turned on when the output voltage decreases below a given voltage value. Depending on the state of the switching element 42, the photocoupler (second photocoupler) 40 is turned on and off, wherein an emitter of its light emitting element is connected, via a resistor 41, to the end of the current detection resistor 33 at the winding side.

Figure 2:
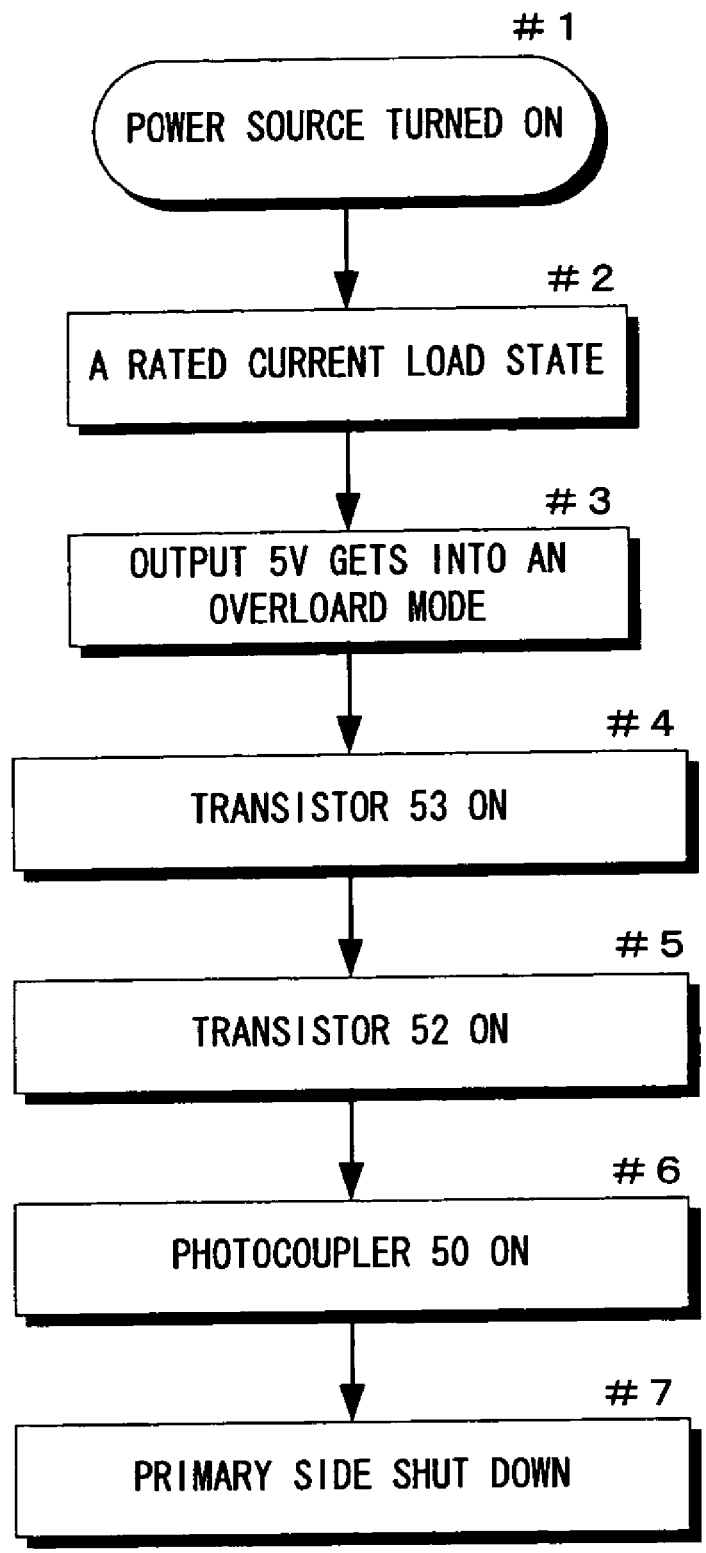
FIG. 2 is a schematic flow chart illustrating an operation of the overcurrent protection circuit.

Hereinafter, the operation of the above-described overcurrent protection circuit will be described with reference to a flow chart of FIG. 2 which illustrates the circuit operation. When the power source is turned on (#1), operational state of the circuit becomes a rated current load state (#2) in the case of normal operation. When the voltage supply section of the secondary side to output 5 V gets into an overload mode for some reason, causing an overcurrent at the output (#3), then the overcurrent is detected by the current detection resistor 33, whereby the transistor 53 is turned on (#4). As a result, the transistor 52 is turned on (#5), whereby the photocoupler 50 is turned on (#6). In response to the feedback signal from the photocoupler 50, the switching power supply controller 7 performs control to decrease the on-duty of the power MOSFET 6 in the primary side, whereby the entire circuit is shut down (#7). Thus, the overcurrent is removed. It is to be noted here that FIG. 2 illustrates only the case where the voltage supply section of the secondary side to output 5 V gets into an overload mode.

In the following, the case where the voltage supply section of the secondary side to output 5 V is brought to short-circuit state or nearly short-circuit state will be described. In this case, the voltage of the secondary side decreases below a given voltage value, which is then detected by the voltage detection resistors 43 and 44, whereby the switching element 42 is turned on, causing the photocoupler 40 to be turned on. Subsequently, the switching power supply controller 7 operates in a manner similar to that described above so as to shut down the entire circuit, thereby removing the overcurrent.

On the other hand, when an overcurrent occurs in the voltage supply section of the secondary side to output 24, it is detected by the current detection resistor 8 as a total overcurrent in the primary side. This is because the amount of such overcurrent in this case is larger than that in the case of the above-described 5 V voltage supply section, so that the entire power supply circuit is more influenced by the overcurrent in this case.

As described above, based on the feedback signals from the photocouplers 50 and 40 and on the detected overcurrent in the primary side, the switching power supply controller 7 performs control to decrease the on-duty of the power MOSFET 6 in the primary side in order to shut down the entire circuit, thereby removing the overcurrent.

According to the current detection performed at the secondary side in the present embodiment as described above, a current flowing through a secondary winding 30 for outputting a low voltage is detected. Accordingly, the current flowing through the secondary winding 30 can be individually limited. Generally, a secondary winding of a transformer for outputting a low supply voltage has a wire diameter smaller than that for outputting a high supply voltage, causing a problem that due to heat generated by overcurrent, insulation breakdown of the former is more likely to occur than that of the latter. However, owing to the current detection according to the present embodiment, such problem can be solved, thereby enhancing safety of the power supply. Furthermore, since no comparator is needed for the overcurrent detection at the secondary side, simple design and low circuit cost can be realized.

It is to be noted that the present invention is not limited to the above described specific embodiment, and various modifications can be made. For example, it is possible to omit the feedback, by the photocoupler 40, of the voltage detection at the secondary side to the primary side, and also omit the switching control based on the results of current detection at the primary side. This is because a desired effect can be obtained by at least performing the feedback control that the detected overcurrent in the secondary winding for outputting the low voltage is fed back by the photocoupler 50 to the primary side.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An overcurrent protection circuit for a switching power supply, comprising:
   a transformer having a primary side comprising a primary winding and a secondary side comprising multiple secondary windings, the primary winding being provided with a DC current;
   a power switching element to switch on and off the DC current in the primary winding for inducing multiple currents in the multiple secondary windings, respectively, the currents being rectified and smoothed to provide multiple DC voltages, respectively, at the secondary side, thereby forming multiple voltage supply sections to output the multiple DC voltages, respectively, at the secondary side;
   a current detection resistor for detecting a current flowing in the secondary side;
   a switching element to be turned on when a voltage between both ends of the current detection resistor exceeds a given voltage value, the switching element comprising a transistor having an emitter connected to a winding side end of the current detection resistor;
   a photocoupler to be turned on and off depending on state of the switching element; and a switching control circuit to control on-duty of the power switching element in response to turning on and off of the photocoupler, wherein the current detection resistor is provided at least in a line of one of the multiple secondary windings which, among the multiple voltage supply sections, belongs to a lower output voltage supply section.

2. The overcurrent protection circuit for a switching power supply according to claim 1, wherein the switching control circuit controls the on-duty of the power switching element in response also to a current value detected at the primary side.

3. An overcurrent protection circuit for a switching power supply, comprising:

a transformer having a primary side comprising a primary winding and a secondary side comprising multiple secondary windings, the primary winding being provided with a DC current;

a power switching element to switch on and off the DC current in the primary winding for inducing multiple currents in the multiple secondary windings, respectively, the currents being rectified and smoothed to provide multiple DC voltages, respectively, at the secondary side, thereby forming multiple voltage supply sections to output the multiple DC voltages at the secondary side;

current detection resistors for detecting currents flowing in the primary side and the secondary side, respectively;

a first switching element to be turned on when a voltage between both ends of the current detection resistor in the secondary side exceeds a given voltage value;

a second switching element to be turned on when the first switching element is turned on;

a first photocoupler to be turned on and off depending on state of the second switching element;

a voltage detection resistor to detect a decrease of the voltage at the secondary side below a given voltage value;

a third switching element to be varied in its on and off state in response to a voltage detected by the voltage detection resistor;

a second photocoupler to be turned on and off depending on state of the third switching element; and a switching control circuit to control on-duty of the power switching element in response to turning on and off of the first and the second photocouplers and in response also to a current value detected at the primary side, wherein the current detection resistor in the secondary side is provided only in a line of one of the multiple secondary windings which, among the multiple voltage supply sections, belongs to a lower output voltage supply section for individually limiting the current flowing through the secondary winding within a maximum allowable current value.

4. The overcurrent protection circuit for a switching power supply according to claim 3, in which the switching power supply is to be used for a laser printer, wherein the multiple voltage supply sections comprise a higher voltage supply section to output 24 V and a lower voltage supply section to output 5 V.

5. An overcurrent protection circuit for a switching power supply, comprising:

a transformer having a primary side comprising a primary winding and a secondary side comprising multiple secondary windings, the primary winding being provided with a DC current;

a power switching element to switch on and off the DC current in the primary winding for inducing multiple currents in the multiple secondary windings, respectively, the currents being rectified and smoothed to provide multiple DC voltages, respectively, at the secondary side, thereby forming multiple voltage supply sections to output the multiple DC voltages, respectively, at the secondary side;

a current detection resistor for detecting a current flowing in the secondary side;

a switching element to be turned on when a voltage between both ends of the current detection resistor exceeds a given voltage value, the switching element comprising a transistor having an emitter connected to a winding side end of the current detection resistor;

a photocoupler to be turned on and off depending on state of the switching element; and a switching control circuit to control on-duty of the power switching element in response to turning on and off of the photocoupler;

wherein the current detection resistor is provided at least in a line of one of the multiple secondary windings which, among the multiple voltage supply sections, belongs to a lower output voltage supply section; and wherein the transistor has a base connected via a temperature compensation diode and a resistor to an opposite end of the current detection resistor.

6. The overcurrent protection circuit for a switching power supply according to claim 3, wherein each of the first and second switching elements comprises a single transistor.

7. An overcurrent protection circuit for a switching power supply, comprising:

a transformer having a primary side comprising a primary winding and a secondary side comprising multiple secondary windings, the primary winding being provided with a DC current;

a power switching element to switch on and off the DC current in the primary winding for inducing multiple currents in the multiple secondary windings, respectively, the currents being rectified and smoothed to provide multiple DC voltages, respectively, at the secondary side, thereby forming multiple voltage supply sections to output the multiple DC voltages, respectively, at the secondary side;

a current detection resistor for detecting a current flowing in the secondary side;

a switching element to be turned on when a voltage between both ends of the current detection resistor exceeds a given voltage value;

a photocoupler to be turned on and off depending on a state of the switching element; and a switching control circuit to control on-duty of the power switching element in response to turning on and off of the photocoupler, wherein the current detection resistor is provided at least in a line of one of the multiple secondary windings which, among the multiple voltage supply sections, belongs to a lower output voltage supply section;

wherein the switching control circuit controls the on-duty of the power switching element in response also to a current value detected at the primary side.

* * * * *